United States Patent [19]

Pitha

[11] 4,337,755
[45] Jul. 6, 1982

[54] SOLAR COLLECTOR BLOCK

[76] Inventor: Jay R. Pitha, R.D. #3, Box 211, Washington, N.J. 07882

[21] Appl. No.: 143,010

[22] Filed: Apr. 23, 1980

[51] Int. Cl.³ .................................................. F24J 3/02
[52] U.S. Cl. ..................................... 126/431; 52/314; 126/449; 126/437; 126/435
[58] Field of Search ............... 126/428, 429, 430, 431, 126/435, 437, 432, 406, 901, 449; 52/314, 316, 405, 173 R, 220

[56] References Cited

U.S. PATENT DOCUMENTS

| | | | |
|---|---|---|---|
| 2,199,112 | 4/1940 | O'Leary | 52/314 |
| 2,714,816 | 8/1955 | Pennell | 52/316 |
| 3,546,833 | 12/1970 | Perreton | 52/314 |
| 4,062,346 | 12/1977 | Rapp | 126/431 |
| 4,062,347 | 12/1977 | Jensen | 126/431 |
| 4,069,809 | 1/1978 | Strand | 126/431 |

Primary Examiner—Albert W. Davis
Assistant Examiner—G. Anderson
Attorney, Agent, or Firm—Hopgood, Calimafde, Kalil, Blaustein & Judlowe

[57] ABSTRACT

This invention relates to the collection of solar energy by use of a novel concrete block construction and to the construction of buildings from such blocks for supplying the hot water requirements for a structure and/or the total heat for the building as well as the hot water supply.

29 Claims, 9 Drawing Figures

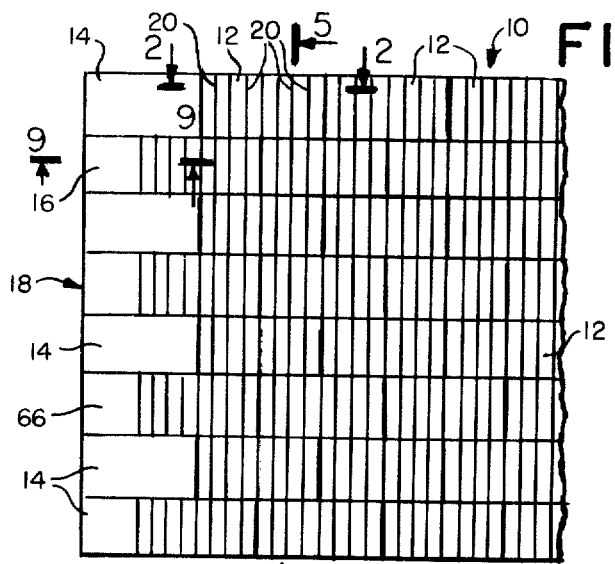
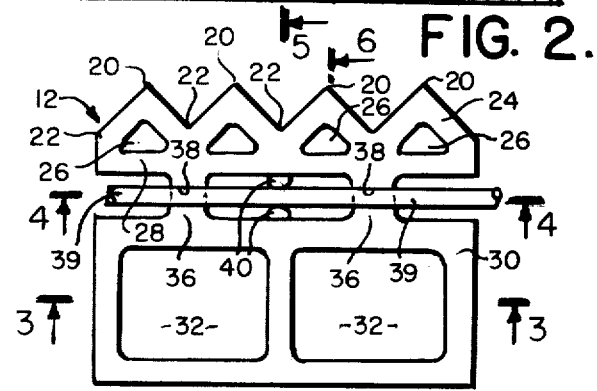
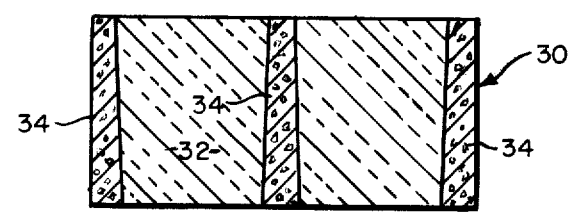
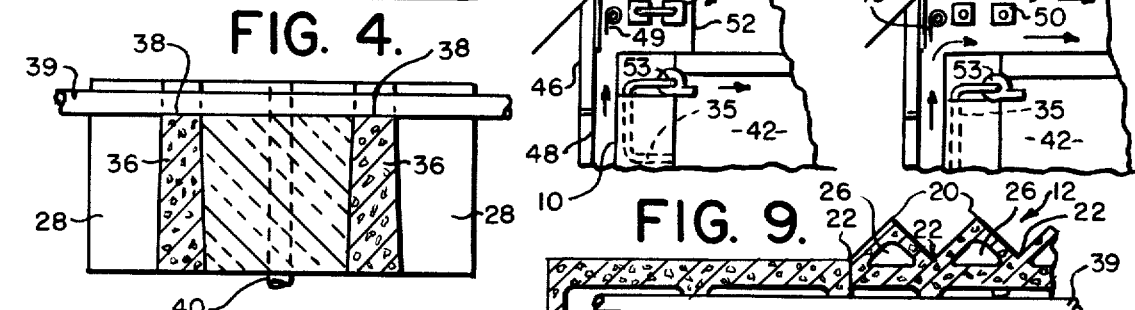
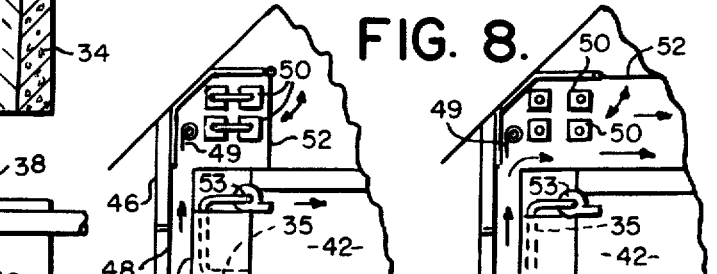
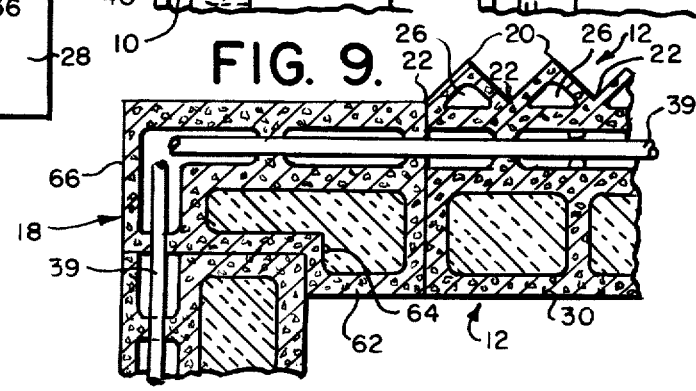

SOLAR COLLECTOR BLOCK

BACKGROUND AND SUMMARY OF INVENTION

It has become common practice to conserve energy by putting heat collectors on a roof or on walls of a building for collecting some of the heat needed for the building, for example the supply of hot water, or all of the heat needed on days when there is ample sunlight. The average building that is to rely on the sun for all of the heat required in the building has been expensive so that a substantial part of the economy of solar heating has been lost.

Instead of adding heat collectors and heat storage equipment to the existing structure of the building, this invention constructs the building in such a way that much of the physical wall structure of the building is itself a heat collector and preferably a part of a wall of the building that requires original structure that makes the wall both a heat collector and a wall of the building structure.

The preferred construction uses novel concrete blocks with structural changes that make the blocks heat collectors as well as structural elements of the building wall, preferably a south wall. Other features of the invention relate to use of the heat collecting wall as one side of a tank which holds sufficient water to provide heat for the building during times when there is insufficient sunlight.

Other objects, features, and advantages of the invention will appear or be pointed out as the description proceeds.

BRIEF DESCRIPTION OF DRAWING

In the drawing, forming a part thereof, in which like reference characters indicate corresponding parts in all the views;

FIG. 1 is a fragmentary view of one end of a south wall of a building constructed with blocks in accordance with this invention;

FIG. 2 is an enlarged, sectional view through one of the blocks shown in FIG. 1, the section being taken on the line 1—1 of FIG. 1;

FIG. 3 is a vertical section taken on the line 3—3 of FIG. 2;

FIG. 4 is a sectional view taken on the line 4—4 of FIG. 2;

FIG. 5 is a sectional view taken on the line 5—5 of FIG. 1;

FIG. 6 is a sectional view taken on the line 6—6 of FIG. 2;

FIGS. 7 and 8 are fragmentary, diagrammatic views of the construction in the air chamber above the walls shown in FIGS. 1 and 5; and FIG. 9 is an enlarged sectional view taken on the line 9—9 of FIG. 1.

DESCRIPTION OF PREFERRED EMBODIMENT

FIG. 1 shows a vertical wall 10 built of blocks 12 which will be described in detail in FIGS. 2-4 and 6. At the left hand end of the wall 12 there are other blocks 14 which are part of another wall 18 which extends usually at right angles to the wall 18 away from the observer viewing the wall 10 from the front of the wall 10 as in FIG. 1. The wall 10 faces south or as near south as possible depending upon the location of the building on the ground. The parallel vertical lines on the blocks 12 represent prism-like grooves on which the sunlight falls to heat the sloping surfaces as will be described in connection with FIG. 2.

FIG. 2 is a horizontal sectional view on the plane represented by line 2—2 of FIG. 1. The face of the blocks 12 shown in FIG. 2 have vertically extending ridges 20 which slope downward to baselines 22 so that there are surfaces extending downwardly from the vertical ridges 20. If the wall 10 faces due south, then the sloping walls are at right angles to each other and at 45° to the right or left of plane which bisects the ridges 20. The advantage of this construction is that in the morning, the sun shines more or less directly on the surfaces that face mostly in an easterly direction. Around noontime, the sloping faces on both sides of the ridges 20 are equally heated by the sun. As the sun moves westerly during the afternoon, the surfaces of the walls which face westerly obtain more direct rays and eventually only the walls facing westerly receive any sunlight. To divide the heat most evenly, the adjacent surfaces on opposite sides of the ridges 20 are substantially at right angles to one another where they meet at the ridges 20.

The face of the block between the vertical ridges 20 and the base line 22 will be referred to herein as the heat absorbing wall 24, and there are chambers 26 located in the block directly behind the vertical ridges 20, and these chambers 26 extend vertically and correspond to the respective ridges 20. The heat absorbing walls 24 are somewhat thicker than the wall that closes the other side of the chambers 26 for structural reasons. This wall is designated by the reference character 28.

In order to give the blocks 12 more stability in a wall, there is a rectangular portion 30 of the block behind the wall 28 and connected to the wall by webs 36 which are integral connecting walls between the wall 28 and the rectangular portion 30 of the block.

FIG. 3 is vertical section on the line 3—3 through the rectangular portion 30 of the block. There are two core openings 32 in the rectangular portion 30 of the block. These core openings 32 have their walls tapered toward the lower ends of the core openings, partly for added strength but mostly for facilitating the manufacture of the blocks by making it easier to pull the structure that occupies the core space during the molding of the block structure. Wall structure 34 which forms the sidewalls of the cores 32 may have parallel outside surfaces depending upon the apparatus with which the block is molded.

The chambers 26 are water passages and are represented diagramatically in FIGS. 5, 7 and 8 as pipes 33 and the wall structure that encloses them are preferably molded in machines similar to those used for making cinder blocks although the material cast in the mold is not the same. The rectangular portion 30 of the block is molded at the same time as the heat collecting portion with the sloping outside faces and these parts of the block, as shown in FIG. 2, are joined together by webs 36 which span the space between the lower walls of the chambers 26 and the confronting space of the rectangular portion 30 of the block. These webs 36 are preferably integral with the structure on both sides of the space which the webs 26 span so that the entire structure of the composite block shown in FIG. 2 is preferably an integral casting, though the material used may have different coefficients of heat absorption toward the front of the block which is exposed to the sunlight; generally, the structure should be of very dense material that is a good conductor of heat, with a coefficient of heat conductivity of at least 12 Btu/HR./°ΔT/ft.$^2$/in. As the wall of a building is constructed, the blocks are preferably tied together by reinforcing rods which include horizontal rods 39 and vertical rods 40. There are depressions 38 in the top surfaces of the webs 36, best shown in FIG. 6, and there are vertical rods 40 placed in the open spaces between the webs 36 alongside of the horizontal reinforcing rods 38, as shown in FIG. 2. The reinforcing rods 38, which extend horizontally, have to be placed in the grooves of the webs 36 after each course of blocks is laid. The vertical reinforcing rods 40, however, can be pushed down, alongside of the rods 38 after the wall has been built to its full height.

The blocks are preferably manufactured of a very dense aggregate. For example, iron ore aggregate, such as Ilmenite, in gradations from ⅜ inch down to fine sand sized particles. This produces a fine-textured, dense block which makes an effective heat transfer medium. By placing heat absorbing paint on the heat collecting wall or using black coloring material in the mix the heat absorbtivity of the block is increased; and a waterproofing agent is added to the mix which will help to waterproof the water jacket and the tank walls. The block thus far described serves as the solar collector block and it is placed so that the faces having the ridges 20 are on the south facing wall of the building and of the water tank within the building in which heat is stored as will be explained in connection with FIG. 5.

The triangular shaped walls shown in FIG. 1 which enclose the chambers 26 form a water jacket which is further treated with waterproofing after the blocks have been assembled to make the wall 10 shown in FIG. 1. The open space behind the wall 28 is filled with concrete, and the large cores 32 are filled with insulating material. The water tank for storing heat behind the solar collector blocks wall 10 are the same as the solar collector blocks except that there are no angularly related faces meeting at vertical ridges 20 as in the blocks which face the sun and there are no chambers 26 for water which is heated by the solar heat which penetrates through the walls of the chambers 26. When the construction of the water tank 42 has been completed, the inside of the tank is completely waterproofed and the top of the tank is covered with a heavily insulated cover to reduce to a minimum any heat that might normally escape from the water in the tank. The size of the tank 42 depends on how much heat the system is capable of storing. This depends to a great extent upon the weather conditions at the place where the tank is to be used. It also depends upon the area of the wall which is exposed to solar heat and a happy medium is to have the tank capable of holding as much hot water as can be produced by the solar heat absorbed through the wall that faces south with sufficient storage capacity to have a useful amount of heat stored in the water during periods when no sunlight is available.

More heat can be collected and stored if the south facing wall 10 is covered with glazing, preferably two layers spaced from one another and indicated diagrammatically in FIG. 5 by the reference characters 46 and 48. Glass can be used but there are many glazing materials available on today's market and such materials will provide air space between the glazing and the wall of approximately 2 to 3 inches.

Such heat as escapes from the water tank 42 into the building in which the tank is housed is useful for providing a minimum supply of heat when none is available from outdoors but heat which escapes to the outdoors through the collector wall can be reduced by providing at the top of the south facing wall, between the wall and the glazing, a reflection blind 49 which can be unrolled at night to reduce the heat that would normally radiate from the south facing wall. As the solar heat collector wall heats up, there is some heat that is not absorbed by the water jacket. This heat will rise between the glazing and the surface of the block wall. An insulated chamber 52 can be provided at the top of the collector wall and fitted with copper heat exchangers 50 through which water can be circulated to absorb this heat. This heat can be put into storage by way of another heat exchanger in the heat storage system. The insulated chamber at the top of the wall, which contains the heat exchangers 50 can be opened at times when the heat exchangers would be inoperative and the hot air could be used directly for building heating requirements; by opening a door 52 (FIGS. 7 and 8).

Water enters the water jacket comprising the chambers 26 from the bottom of the tank 42. As it is heated by the solar energy collected, it will, naturally, rise and discharge again into the top of the water tank. To increase the efficiency and the speed of the water travelling through the jacket, a circulating pump 53 can be installed.

There are many ways of utilizing heat once it is collected. The easiest way is through the use of heat exchangers, which can be installed in the top of the storage tank 42 and hooked into the hot water heating system of a house. A similar heat exchanger would be provided to supply domestic hot water for the house.

In order to make the blocks waterproof, material can be added to the block mix and water. Examples of such materials are "Anti-Hydro" manufactured by the Anti-Hydro Company in Newark, N.J. Another suitable material is "Radcon, Formula No. 7" manufactured by Radcon Industries, Inc. in Las Vegas, Nev.

Waterproofing materials that can be used to waterproof the surface of the water jacket and the inside walls of the storage tank include "Aridsil" manufactured by the Anti-Hydro Company of Newark, N.J. Radcon, Formula No. 7 can also be used on the surface of a block wall to make it waterproof; and so can "Surewall Surface Bonding Cement" manufactured by W. R. Bonsall Company, Lilesville, N.C. Glazing materials that can be used include sheets of clear window glass of anyone's manufacture; sheets of "Sun-Lite Glazing Material" manufactured by Kalwall Corporation of Manchester, N.H. This same company makes insulated panels with a layer of air between them and a combination of the Sun-Lite material combined with DuPont Teflon FEP film, manufactured by the DuPont Corporation, Wilmington, Del.

FIG. 9 is an enlarged sectional view of a corner block 62, used where the walls 12 and 18 come together. This block 62 is flush with the inside surface of the collector block 12 but does not have the vertical ridges 20 toward the left in FIG. 9. The lower or inside wall of the block 62 has an offset 64 beyond which the left hand end surface of the block 62 has a face 66 with an area equal to one-half of the area of the collector blocks not considering the surfaces of the ridges of the collector blocks. An outside face 68 of the block 62 is of the same height and width as the collector blocks to have the blocks fit together at corners of the building as shown in FIG. 1.

The preferred embodiments of the invention have been illustrated and described, but changes and modifications can be made and some features of the claims can be used in different combinations without departing from the invention.

What is claimed is:

1. Apparatus for collecting solar heat comprising a building block including a front outside surface for facing in a generally southern direction, the outside face having surfaces that meet with one another along lines from which the said surfaces slope away from the south so that the sun strikes intervening areas of said sloping faces when the sun shines on said sloping surfaces in the morning and afternoon respectively, first passage-defining chambers in the block extending generally parallel to said lines from which the surfaces slope away from a north-south meridian, walls closing the rearward parts of the chambers, the block having a rearward portion that is secured to the walls closing the rearward parts of the chambers for stiffening the block, a chamber in the rearward portion of the block, and heat insulating material in the chamber for impeding the flow of heat from the rearward portion of the block toward the front face of the block when there is no sunlight shining on the front face, the walls of the block and all of the chambers being part of a continuous casing, and said first chambers being adapted for vertically continuous circulating-fluid passage alignment when plural such blocks are arrayed in successive layers to define a wall.

2. The apparatus described in claim 1 characterized by the front face of the block having a surface that is of sawtooth shape in horizontal section, a groove extending horizontally of the block and opening from a top surface of the block for receiving a horizontal rod that extends from the block to an adjacent similar block for holding the blocks in assembled relation.

3. The apparatus described in claim 1 characterized by a vertical rod clearance in the block in position for holding a vertically extending reinforcing rod in position to project into a similar vertical clearance in an adjacent block that has a clearance into which the reinforcing rod can extend to connect similar blocks in substantially vertical alignment when said vertical rod clearances are filled with concrete.

4. The apparatus described in claim 1 characterized by the outside face of the block having ridges, each ridge being of generally triangular cross-section and the apex of each triangle extending generally vertical, the back wall of each of the triangular chambers being in substantial alignment with each other in substantially the same generally vertical plane and integrally defining the front wall of the block.

5. The apparatus described in claim 1 characterized by the block having vertically extending chambers behind the front surface of the block, other chambers closed at the rearward wall of the block and by an intermediate wall extending lengthwise of the block, said other chambers containing heat insulating material to reduce heat flow between the front and back of the block.

6. The apparatus described in claim 1 characterized by the block having a coefficient of heat conductivity of at least 12 Btu/HR./°ΔT/ft.$^2$/in.

7. The apparatus described in claim 1 characterized by the block being part of a structure containing a plurality of similar blocks disposed in superimposed layers with the blocks of each layer adjacent to a block of the same layer and comprising a block wall.

8. Apparatus for collecting solar heat comprising a building block including a front outside surface for facing in a generally southern direction, the outside face having surfaces that meet with one another along lines from which said surfaces slope away from the south so that the sun strikes intervening areas of said sloping faces when the sun shines on said sloping surfaces in the morning and afternoon respectively, first chambers in the block extending generally parallel to said lines from which the surfaces slope away from a north-south meridian, walls closing the rearward parts of the first chambers, the block having a rearward portion including a rear wall that is secured to the walls closing the rearward parts of the first chambers for stiffening the block, other chambers closed at the rear wall of the block and by an intermediate wall extending lengthwise of the block, said other chambers containing heat-insulation material to reduce heat flow between the front and back of the block, and intermediate chambers between the rearward portions and the walls closing the rearward parts of the first chambers, the walls of all of the chambers being part of a continuous casting and said first chambers being adapted for vertically continuous circulating-fluid passage alignment when plural such blocks are arrayed in successive layers to define a wall.

9. Apparatus for collecting solar heat comprising a building block including a front outside surface for facing in a generally southern direction, the outside face having surfaces that meet with one another along lines from which the said surfaces slope away from the south so that the sun strikes intervening areas of said sloping faces when the sun shines on said sloping surfaces in the morning and afternoon respectively, chambers in the block extending generally parallel to said lines from which the surfaces slope away from a north-south meridian, walls closing the rearward parts of the chambers, the block having a rearward portion that is secured to the walls closing the rearward parts of the chambers for stiffening the block, a chamber in the rearward portion of the block, and heat insulating material in the chamber for impeding the flow of heat from the rearward portion of the block toward the front face of the block when there is no sunlight shining on the front face, the wall of the block and all of the chambers being part of a continuous casting, said block being part of a structure containing a plurality of similar blocks disposed in superimposed layers with the blocks of each layer adjacent to a block of the same layer and comprising a block wall, front chambers of layered blocks aligning to form front passages, the front passages of the blocks being waterproof and having means for waterproof seals between the upper and lower ends of each front passage with the upper and lower ends of other passages with which the front passages communicate to provide vertical chambers through which water flows in the wall in heat exchanging relation with the front walls of the blocks.

10. The apparatus described in claim 9 characterized by said block wall being one of the enclosing walls of a tank for water, the other enclosing walls of the tank being of second generally similar block construction except that only the front wall of the tank contains passages that are enclosed by solar collection walls, the other walls of the tank being constructed of concrete blocks having cores filled with heat insulation material to prevent escape of heat from the water in the tank through the walls of the tank.

11. The apparatus described in claim 10, wherein all blocks have cores with reinforcing rods placed horizontally in core grooves designed for the rods at similar locations in each course of block for reinforcing the wall as it is structured, each such rod linking a plurality of adjacent blocks.

12. The apparatus described in claim 11 characterized by said solar-collector blocks and said second blocks having large cores closest to the inside wall and filled with insulating material.

13. The apparatus described in claim 9 characterized by the blocks being molded concrete blocks with water-proofing agents incorporated into the mix from which the blocks are made so that the blocks when set are waterproof.

14. The apparatus described in claim 9 characterized by the block wall being one of the enclosing walls of a water tank, the inside surfaces of the water tank being coated with material that makes the blocks waterproof when exposed to water in the tank.

15. The apparatus described in claim 9 characterized by the outside blocks that enclose the side of the structure that is exposed to sunlight being protected from the elements by panels of transparent material that cover the solar heat collector blocks.

16. The apparatus described in claim 9 characterized by each block having a front face with the outside surface having substantially vertical parallel ridges that are joined to one another, walls of the front surface of each block between the parallel ridges, chambers behind the respective ridges, each chamber being of generally triangular cross-section with the back wall of each chamber in substantially a parallel plane with the back wall of the block.

17. Apparatus for collecting solar heat comprising a building block including a front outside surface for facing in a generally southern direction, the outside face having surfaces that meet with one another along lines from which the said surfaces slope away from the south so that the sun strikes intervening areas of said sloping faces when the sun shines on said sloping surfaces in the morning and afternoon respectively, chambers defining heat-collecting passages in the block extending generally parallel to said lines from which the surfaces slope away from a north-south meridian, walls closing the rearward parts of the chambers, the block having a rearward portion that is secured to the walls closing the rearward parts of the chambers for stiffening the block, a chamber in the rearward portion of the block, and heat insulating material in the chamber for impeding the flow of heat from the rearward portion of the block toward the front face of the block when there is no sunlight shining on the front face, the wall of the block and all of the chambers being part of a continuous casting, said block being part of a structure containing a plurality of similar blocks disposed in superimposed layers with the blocks of each layer adjacent to a block of the same layer and comprising a block wall, a water storage tank in communication with the heat collecting passages of the blocks that have the sloping faces exposed to the sunlight, said heat collecting passages of the blocks being in communication with the tank at both ends of said heat collecting passages so that the water in the tank circulates repeatedly through the passages in the blocks to continuously add to the heat in the water in the tank as long as there is heat in the blocks at a higher temperature than the water in the tank.

18. The apparatus described in claim 17 characterized by the water storage tank being made of molded blocks and the heat collector wall being one side of the tank, the blocks of the tank being laid in the wall in a slurry of cement which hardens to a waterproof and hard consistency.

19. The apparatus described in claim 18 characterized by horizontal reinforcing bars located in central cores of the blocks to provide added strength to the walls of the tank.

20. The apparatus described in claim 19, wherein each horizontal reinforcing bar extends through the central core of each of a plurality of horizontally adjacent blocks.

21. The apparatus described in claim 19, wherein vertical reinforcing bars extend through vertically aligned chambers of the block wall.

22. The apparatus described in claim 18 characterized by the water storage tank being made of molded block and the heat collector wall having vertically extending reinforcing rods that extend from center cores of the blocks, the center cores being filled with concrete to make the walls capable of withstanding any water pressure generated by the water in the water storage system.

23. The apparatus described in claim 17 characterized by the chambers in the rearward portions of the blocks having relatively large cores nearest to the inside wall of the tank, and an insulated cover on the tank.

24. The apparatus described in claim 17 characterized by the structure being a building having a southern wall thereof built of said blocks behind which there is space to accommodate the water of the heat storage tank, a glazing layer attached to the front collector block wall, the glazing being spaced from the wall so that air heated in the space between the glazing and the heat collector block can be added to the heat collected by the block wall, or utilized directly in heating the building.

25. The apparatus described in claim 17 characterized by the aggregate being made principally of iron ore in graduations from three-eights inch to fine sand-sized particles for obtaining a fine-textured, dense block which will serve as an effective heat transfer medium.

26. The apparatus described in claim 17 characterized by the aggregate having a color that approaches black so as to increase the heat absorbtivity of the blocks, and a waterproofing agent in the mixture for providing a block with waterproof walls for construction of the tank walls.

27. Apparatus for collecting solar heat comprising a building block including a front outside surface for facing in a generally southern direction, the outside face having surfaces that meet with one another along lines from which the said surfaces slope away from the south so that the sun strikes intervening areas of said sloping faces when the sun shines on said sloping surfaces in the morning and afternoon respectively, chambers in the block extending generally parallel to said lines from which the surfaces slope away from a north-south meridian, walls closing the rearward parts of the chambers, the block having a rearward portion that is secured to the walls closing the rearward parts of the chambers for stiffening the block, a chamber in the rearward portion of the block, and heat insulating material in the chamber for impeding the flow of heat from the rearward portion of the block toward the front face of the block when there is no sunlight shining on the front face, the wall of the block and all of the chambers being part of a continuous casting, said block being part of a structure containing a plurality of similar blocks disposed in superimposed layers with the blocks of each layer adjacent to a block of the same layer and comprising a block wall, the blocks being manufactured of an aggregate comprising a substantial proportion of iron ore in gradations from substantially ⅜ inch down to particles of the size of fine sand, whereby the resulting wall is an effective heat transfer medium.

28. Apparatus for collecting solar heat comprising a building block including a front outside surface for facing in a generally southern direction, the outside face having surfaces that meet with one another along lines from which the said surfaces slope away from the south so that the sun strikes intervening areas of said sloping faces when the sun shines on said sloping surfaces in the morning and afternoon respectively, chambers in the block extending generally parallel to said lines from which the surfaces slope away from a north-south meridian, walls closing the rearward parts of the chambers, the block having a rearward portion that is secured to the walls closing the rearward parts of the chambers for stiffening the block, a chamber in the rearward portion of the block, and heat insulating material in the chamber for impeding the flow of heat from the rearward portion of the block toward the front face of the block when there is no sunlight shining on the front face, the wall of the block and all of the chambers being part of a continuous casting, said block being part of a structure containing a plurality of similar blocks disposed in superimposed layers with the blocks of each layer adjacent to a block of the same layer and comprising a block wall, there being chambers in the blocks in position to provide continuous passages formed by the passages of adjacent blocks being in line with one another including passages in the south facing triangular cross-section cores of adjacent blocks which lead to a water tank behind the solar collector wall and communicating with a water tank to which heat collected by the water passages flows into the water tank behind the heat collector wall.

29. Apparatus for collecting solar heat comprising a building block including a front outside surface for facing in a generally southern direction, the outside face having surfaces that meet with one another along lines from which said surfaces slope away from the south so that the sun strikes intervening areas of said sloping faces when the sun shines on said sloping surfaces in the morning and afternoon respectively, chambers in the block extending generally parallel to said lines from which the surfaces slope away from a north-south meridian, walls closing the rearward parts of the chambers, the block having a rearward portion including a rear wall that is secured to the walls closing the rearward parts of the chambers for stiffening the block, other chambers closed at the rear wall of the block and by an intermediate wall extending lengthwise of the block, said other chambers containing heat-insulating material to reduce heat flow between the front and back of the block, and said block being a single concrete casting containing Ilmenite as an essential ingredient.

* * * * *